July 3, 1923.
C. S. TILDEN
TUBULAR FRAME
Filed March 22, 1922
1,460,928
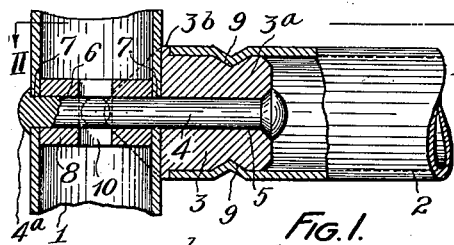
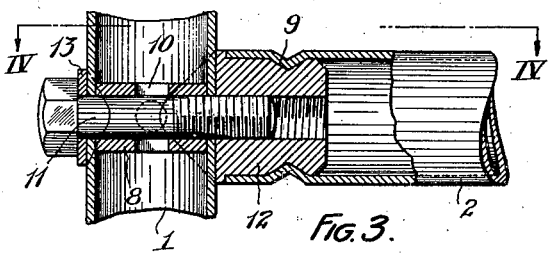
FIG.1. FIG.3.
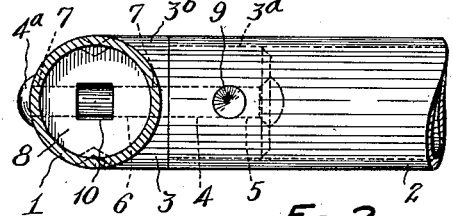
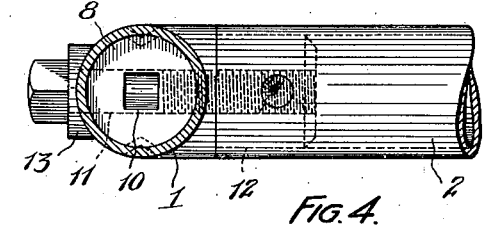
FIG.2. FIG.4.
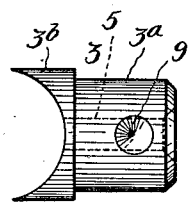 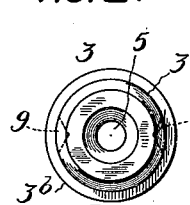 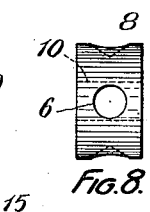 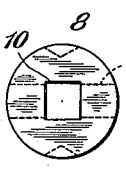 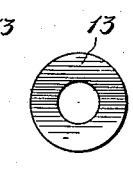 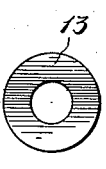
FIG.6. FIG.7. FIG.8. FIG.9. FIG.10. FIG.11.
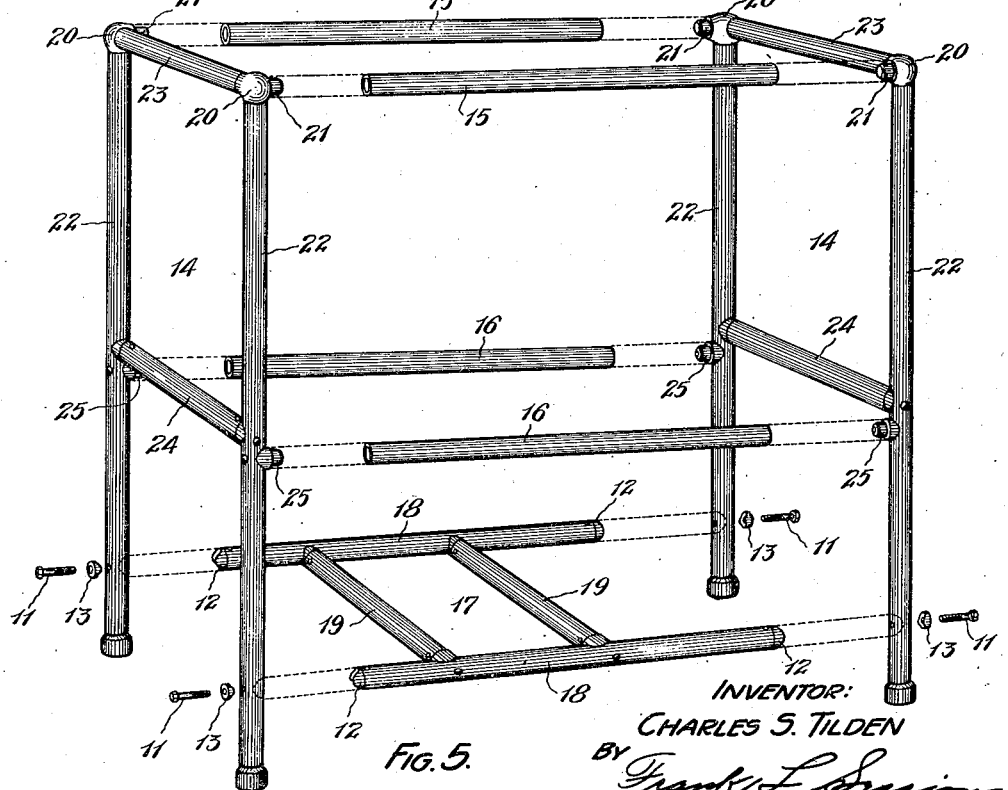
FIG.5.
INVENTOR:
CHARLES S. TILDEN
BY
ATTORNEY.

Patented July 3, 1923.

1,460,928

UNITED STATES PATENT OFFICE.

CHARLES S. TILDEN, OF CLEVELAND, OHIO, ASSIGNOR TO THE ELYRIA IRON & STEEL COMPANY, OF CLEVELAND, OHIO.

TUBULAR FRAME.

Application filed March 22, 1922. Serial No. 545,843.

*To all whom it may concern:*

Be it known that I, CHARLES S. TILDEN, a citizen of the United States, residing at Cleveland, in the county of Cuyahoga and State of Ohio, have invented certain new and useful Improvements in Tubular Frames, of which the following is a specification.

My invention relates to improvements in tubular frame joints. Among the objects of my invention are:—to provide a strong and easily assembled joint for tubular frames such as are used in bedstead, washing machine, adding machine, sewing machine and other similar frames; to provide a smooth joint free from projections on which clothing might be caught; and to provide means for reinforcing the tube at the portions where the joints are made to prevent buckling or distorting of the tube.

I attain the foregoing and other objects by means of the structures illustrated in the accompanying drawing, in which—

Fig. 1 is a fragmentary section through the axes of two tubes connected in a tubular frame by a non-detachable T joint;

Fig. 2 is a section on line II—II of Fig. 1;

Fig. 3 is a fragmentary section through the axes of two tubes connected in a tubular frame by a detachable T joint;

Fig. 4 is a section on line IV—IV of Fig. 3;

Fig. 5 is a perspective view of a disassembled frame showing types of joints embodying my invention and their application to a tubular frame;

Fig. 6 shows the metal plug which fits in the end of one of the joined tubes;

Fig. 7 is an end view of the plug shown in Fig. 6;

Fig. 8 shows the reinforcing member through which the bolt or rivet passes;

Fig. 9 is an end view of the part shown in Fig. 8;

Fig. 10 shows a plano-concave washer for the bolt head in the detachable form of joint; and Fig. 11 is an end view of the part shown in Fig. 10.

Similar numerals refer to similar parts throughout the several figures of the drawings.

In the drawings, 1 and 2 are sections of tube to be joined at right angles to each other. In Figs. 1, 2, 3 and 4, plug, 3, is seen inserted and fixed in the end of tube, 2. The plug, 3, is preferably made with a shank portion, $3^a$, which fits the inner diameter of the tube, and an enlarged portion, $3^b$, forming a transverse shoulder on the shank, $3^a$, of the same diameter as the outer diameter of the tube so that when the plug is inserted into the tube and the frame is finished the line of the joint at the shoulder is not noticeable.

The outer end of plug, 3, is hollowed out or made concave and of such a radius that it will closely fit the surface of tube, 1. In the riveted form of joint shown in Figs. 1 and 2, a rivet, 4, passes through a hole, 5, in plug, 3, and corresponding holes, 6 and 7, respectively in the reinforcing member, 8, and tube, 1, and is riveted over to form a head, $4^a$. Plug, 3, is held in tube, 2, preferably by indenting the metal of the tube at one or more places into recesses such as that shown at 9 formed in the outer surface of the plug. These recesses may be made by drilling or pressing or otherwise making them in the metal of the plug, 3, in well known manners. I prefer to provide a square hole, 10, through the center of the reinforcing member, 8, to facilitate positioning it in the tube. A square rod may be inserted into this hole and by its aid the member, 8, may be set at any desired place in the tube by pushing it in the required distance and then twisting it until the rivet holes in the reinforcing member and tube register with each other.

A screw, 11, shown in Figs. 3 and 4, threaded into a suitably threaded aperture in the plug, 12, may be employed in place of a rivet in order to form a detachable joint which can be readily taken apart and reassembled. A plano-convex washer, 13, may be employed to form the seat for the head of the screw, 11.

Plug, 3, is shown in detail in Figs. 6 and 7. Plug, 12, is similar to plug, 3, with the exception that in plug, 12, a threaded instead of a plain aperture is provided.

In both the riveted and bolted forms of joints the indentation method described above is preferably used for holding both the end plug and the reinforcing disc in their proper positions in the tubes.

Fig. 5 is a perspective diagrammatic view of a disassembled or "knocked down" frame composed of two end panels, 14, 14, adapted to be connected by the longitudinal tubes, 15, 15, 16, 16, and the tubular bottom frame, 17, which in turn is made up of longitudinal tubes, 18, 18, and cross tubes, 19, 19. The top corner members, 20, are in the form of three way plugs each being provided with three shank portions such as are shown at 21, each of which is made similar to the shank portion, 3ª, of plug, 3, with the exception that in the drawings the parts, 20, are not provided with rivet or bolt apertures.

The panels, 14, are composed of vertical, tubular, corner or leg members, 22, and tubular cross members, 23, 24. Each panel is pre-assembled, the joining of its members being accomplished in accordance with my invention. The panels, 14, preferably embody plugs, 21 and 25, pairs of which are positioned opposite to and in alignment with each other when the panels are assembled into the complete frame. If the bottom panel, 17, is to be used for supporting a weight, as for instance the motor of a washing machine, or, if it is desired to make it separately detachable, its longitudinal members, 18, may be joined to the legs, 22, by employing the detachable form of joint shown in Figs. 3 and 4. In assembling the complete frame shown in Fig. 5 the panels, 14, are placed opposite each other with the pairs of plugs, 21 and 25, presented towards each other, the longitudinal tubular members, 15 and 16, are pressed upon the plugs, 21 and 25, respectively, and the metal of the tubular members, 15 and 16, is indented into recesses in the plugs such as those shown at 9 in Figs. 6 and 7 to firmly secure these members together. The frame, 17, is placed in position between the opposite pairs of legs, 22, the longitudinal bars, 18, having plugs similar to those shown at 12 in Figs. 3 and 4 secured to them. The screws, 11, provided with washers, 13, are now inserted through the apertures provided in tubes, 22, and reinforcing members which are inserted into the tubes, 22, and are screwed into the plugs, 12, to secure the panel, 17, firmly to the legs, 22.

In Fig. 5 the parts of the frame including the screws, 11, and washers, 13, are shown disassembled or "knocked down" ready to be packed for shipment or to be assembled into the complete frame by moving along the diagrammatic dotted lines in the manner which has been described.

By the use of my invention the parts of tubular frames of relatively large dimensions may be manufactured and, if desired, may be finished by electro plating, painting, japanning or any other suitable manner and may be shipped "knocked down" in small compact packages to the place where they are to be used where they may be readily reassembled into strong, rigid, frames. My invention provides a simple but adequately strong joint for tubular frames which is economical of material and which can be manufactured readily and at low cost. It will be observed that all of the tubes used have square cut ends thus eliminating fish mouth and flanged ends which are more difficult and expensive to make. These and other advantages of my invention will be apparent to those skilled in the art.

It is obvious that various combinations of vertical or horizontal panels may be made with suitable, connecting, tubular members or panels and that the joints between the tubular members of the panels and between the panels and the panel-connecting members may be made either non-detachable or detachable without departing from the spirit or scope of my invention.

I claim:

1. In a tubular frame, a reinforced joint for connecting two tube members, comprising a plug having a shank portion adapted to be inserted into the end of one of said tubes, said shank portion being provided with a recess in its outer surface adapted to have the metal of said tube indented into it, said plug having an enlarged portion forming a shoulder surrounding said shank, said enlarged portion being hollowed out to adapt it to fit the external surface of the other of said tube members, a reinforcing member adapted to be inserted into said last named tube, said plug having a longitudinal aperture, said reinforcing member having a transverse aperture, and fastening means in said apertures adapted to draw said plug and said reinforcing member towards each other, said reinforcing member having an aperture adapted to receive a positioning rod.

2. In a tubular frame, the combination of two tube members joined at right angles to each other, a plug inserted into the end of one of said tubes and secured thereto by indenting the metal of said tube into a recess provided in the surface of said plug, said plug extending outwardly from the end of said tube and being hollowed out in a direction transverse to said tube to fit the exterior surface of the other of said tubes, a reinforcing member in said last named tube, said plug, said reinforcing member and said last named tube having registering apertures, and means in said registering apertures for clamping together said plug and said last named tube, said reinforcing member having an aperture adapted to receive a positioning rod, said last named aperture being adapted to prevent the rotation of said rod therein.

3. In a tubular frame a reinforced joint for connecting two tube members, comprising a plug having a shank portion adapted to be inserted into the end of one of said tubes, said shank portion being provided with a recess in its outer surface adapted to have the metal of said tube indented into it, said plug having an enlarged portion forming a shoulder surrounding said shank, said enlarged portion being hollowed out to adapt it to fit the external surface of the other of said tube members, a reinforcing member adapted to be inserted into said last named tube said plug having a longitudinal aperture, said reinforcing member having a transverse aperture, and fastening means in said apertures adapted to draw said plug and said reinforcing member towards each other.

4. In a tubular frame of the class described, the combination of two tube members joined at right angles to each other by a plug inserted into the end of one of said tubes and secured thereto by indenting the metal of said tube into a recess provided in the surface of said plug, said plug extending outwardly from the end of said tube and being hollowed out in a direction transverse to said tube to fit the exterior surface of the other of said tube members, a reinforcing member in said last named tube, said plug, said reinforcing member and said last named tube having registering apertures, and means in said registering apertures for clamping together said plug and said last named tube.

5. In a tubular frame of the class described, a pair of oppositely disposed tubular frame panels, said panels embodying tubular-joint, plug members, the shanks of oppositely disposed plug members of said panels being in alignment with each other, and tubular connecting members adapted to fit upon said plugs and to be secured thereto by indenting the metal of said tubes into recesses in the surfaces of said plugs.

6. In a tubular frame of the class described, the combination of angularly disposed tubular members joined together by a plug engaging an end of one of said tubes and secured thereto by integral co-operating engaging means, said plug having a surface complementary to that of another tube and engaging said other tube, a reinforcing member in said other tube, and means to unite said reinforcing member, plug, and the tubes into a rigid structure.

7. In a tubular frame of the class described, the combination of angularly disposed tubular members joined together by a plug engaging an end of one of said tubes and secured thereto by integral co-operating permanently engaging means, said plug having one of its surfaces complementary to that of another tube, and engaging said other tube at said complementary surface, a reinforcing member in said other tube, said reinforcing member provided with positioning means, and means to unite said reinforcing member, plug, and the tubes into a rigid structure.

8. In a tubular frame of the class described, the combination of angularly disposed tubular members joined together by a plug engaging an end of one of said tubes, and secured thereto by integral co-operating permanently engaging means, one of the surfaces of said plug being flush with the outer surface of the tube to which it is engaged, another surface of said plug being complementary to that of another tube, and engaging said other tube at said complementary surface, a reinforcing member in said other tube, said reinforcing member provided with positioning means, and means to unite said reinforcing member, plug, and the tubes into a rigid structure.

In testimony whereof I affix my signature.

CHARLES S. TILDEN.